US006281315B1

(12) United States Patent
Gonzalez et al.

(10) Patent No.: US 6,281,315 B1
(45) Date of Patent: *Aug. 28, 2001

(54) SOLID POLYMERIC MATRICES CONTAINING RHODAMINES AND THEIR USE IN LASERS

(75) Inventors: Angel Costela Gonzalez; Immaculada Garcia Moreno; Juan Manuel Figuera Acebal; Miguel Rodriguez Artigas; Alberto Ulises Acuña Fernandez; Francisco Amat Guerri; Roberto Sastre Muñoz, all of Madrid (ES)

(73) Assignee: Consejo Superior Investigaciones Cientificas, Madrid (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,305

(22) PCT Filed: Jun. 28, 1996

(86) PCT No.: PCT/ES96/00139

§ 371 Date: Jun. 12, 1997

§ 102(e) Date: Jun. 12, 1997

(87) PCT Pub. No.: WO97/04510

PCT Pub. Date: Feb. 6, 1997

(30) Foreign Application Priority Data

Jul. 14, 1995 (ES) .................................................. 9501419

(51) Int. Cl.[7] ............................ C08F 24/00; C08F 18/12; C07C 6/00

(52) U.S. Cl. ..................... 526/266; 526/268; 526/292.3; 526/328; 526/328.5; 525/329.9; 525/330.1; 525/330.5; 8/648; 204/157.15; 204/157.41; 204/157.61

(58) Field of Search ............................... 8/648; 528/329.9, 528/330.1, 330.5; 204/157.15, 157.41, 157.61; 526/292.3, 328, 328.5, 266, 268

(56) References Cited

U.S. PATENT DOCUMENTS 5,136,005  8/1992  Hermes ............................. 526/292.3

FOREIGN PATENT DOCUMENTS 414430  2/1991  (EP) .
2068115  4/1995  (ES) .
48-025279  6/1970  (JP) .

OTHER PUBLICATIONS

Allinger Normal L.: "Quimica Organica", EDT, Reverte, 19981, Barcelona XP002014287, vol.1, Chapter 16, especially pp. 541–544.
F. Amat–Gubrri et al. (1993) Chem. Phys. Lett. 209:352–6.

Primary Examiner—Frederick Krass
(74) Attorney, Agent, or Firm—Klauber & Jackson

(57) ABSTRACT

The present patent of invention describes the obtention of lasers in solid condition of dyes of the family of Rhodamines. More particularly, it describes lasers in which said dye or chromophore is to be found covalently anchored to a solid matrix, consisting in a transparent organic polymer and suficiently stable to the pumping radiation. Its application is the production of the laser emittance by an organic dye in a solid matrix and polymers containing rhodamines.

37 Claims, No Drawings

SOLID POLYMERIC MATRICES CONTAINING RHODAMINES AND THEIR USE IN LASERS

This appln. is a 371 of PCT/FS96/00139, filed Jun. 28, 1996.

Dye lasers are profusely applied in very different fields. For example, they are used every day more and more in Medicine for the selective destruction of tissue, by means of the so called photodynamic therapy, and for the "in situ" diagnosis of possible tumours. However, both in the industrial field and in their medical applications, the employment of dye lasers implies the use of dyes in solutions, which signifies a series of disadvantages and limitations, which are: the employment of organic solvents, some of which are toxic and volatile, the maintenance of a constant flow of the dye solution within the cavity of the laser; and other tedious operations, such as having to renew the dye solution, or else replace it when a change of spectral region of the emittance of the laser is desired. For this, the availability of solid dye lasers, with notable advantages over liquid lasers is of great technical interest, since besides being more compact with a notable decrease in its size, it allows working in the absence of solvents, a particularly important aspect during its clinical use, and also, with a minimum maintenance, capable of changing the spectal interval of the laser emittance in a rapid and simple manner. Other additional advantages derived from the use of a solid dye laser are, the freedom of design of the cavity and the low cost of the same when the solid is a polymer.

A laser is a luminous source, the light of which, monochromatic and coherente, originates from the emittance stimulated by the radiation of a material. As its name indicates, the stimulated emittance is the one which is caused by the disactivation of previously excited conditions caused by the actual radiation emitted by the material. If said material is a fluorescent colorant, the laser is called of dye. Attending to the energetic levels implied by the laser emittance, the dye lasers may be considered as four level lasers.

The basic operational mechanism of a dye laser is herewith described. If a dye solution for laser is illuminated with light with a wave length which falls within its absorption band (pumping radiation), the molecules of said dye are excited from the fundamental level singlet $S_o$ up to some rotovibrational level of the first excited singlet condition $S_i$. Due to collisions with other molecules, the excess of rotovibrational energy is rapidly dissipated in the form of heat, and so, the molecule relaxes to a rotovibrational level below $S_1$. In S1 condition, the molecule may emit spontaneous fluorescent radiation, passing to any rotovibrational level of fundamental conditionl $S_o$. Finally, relaxation non radioactive processes carry the molecule to rotovibrational level zero from fundamental condition. The light emitted has always a wave length which is longer than that of the pumping radiation, due to the fact that part of the excitment energy is dissipated by non radioactive processes. If the dye is excited at the second excitment singlet, or level $S_2$, or at other higher levels, the molecule may decline by non radioactive processes to condition $S_1$. If the intensity of the pumping radiation is sufficiently high, for example 100 kw/cm$^2$, it may be achieved that the number of molecules in excited condition $S_1$ be superior at all times to that of the molecule in fundamental condition $S_o$ (population reversal), the stimulated emittance or laser being then possible throughout all the fluorescent band, with the exception of the part which overlaps with the absorption band.

STATE OF THE ART

The dyes available for use as a source of laser radiation, obtained by organic synthesis, over a wide spectral zone, from 340 nm (stilbenes) up to 1200 nm (cyanines), all present high monochromaticity in the emittance and the majority operate as has just been described. In the practical application of this type of dyes two limiting factors exist: a) the photostability, since the dyes must support very high pumping energies and a prolonged exposure to radiation, which may cause its degrading, losing effectivity as emitting sources; and b) syntonization interval since the majority of the normal dyes have only small wave length intervals in which the the laser efficiency is acceptable.

The use of a laser dye solution in a solid medium has evident technical advantages as regards the use of a liquid medium; the sample is more manageable and attainable, generally of low density, easily machinable, etc. The stimulated emittance generated by Rhodamine G dispersed in poly(methyl methacrylate) was described for the first time in 1967 by Söffer and McFarland [*Appl. Phys. Lett.* 10, 266 (1967)] and the stimulated emittance of rhodamines B and 6G dispersed in the same polymer was described a year later by Peterson and Snavely [*Appl Phys. Lett* 12 238(1968)]. Since then, a great variety of solid matrices have been described (polycarbonates, polystyrene, polyvinylalcoholes and polyacrylates) in which diverse types of dyes have been dispersed.

However, due to the generally scarce resistance of the polymeric matrix to strong pumping radiations, as well as to the generally low thermal stability of the dyes, its extensive use has been impossible up to the present. None the less, the work carried out by O'Conell and col.[*Opt. Eng.* 22 393 (1983)] indicates that the duly purified poly(methyl methacrylate) is a polymer which is resistant to intense radiation. Another additional difficulty lies in the low solubility of the laser dyes, developed up to this moment in the majority of conventional polymers. In fact, in the described examples in the literature, the dye is not to be found really disolved but in the majority of the cases, dispersed in the matrix.

A detailed description of the state of the art has been recently published by our working group [R. Sastre, A.Costela, *Adv. Mater.* 7, 198 (1995)]. In reality, our working group has managed to obtain laser emittance, with reasonable efficacy and an incremented photostability as regards previous works, with real solutions of Rhodamine 6G dye and Rhodamine 640 dye in polymeric matrices (poly (methyl methacrylate), poly (methacrylate 2-hydroxyethyl)) [F.Amat Guerri, A.Costela, J. M.Figuera, F.Florido, I.Garcia-Moreno and R.Sastre, *Opt. Commun.* 114, 442 (1995), R.Sastre and A.Costela, *Adv. Mater.* 7 198(1995); A.Costela, F.Florido, I. García-Moreno, R Duchowicz, F.Amat Guerri, J. M.Figuera and R. Sastre, *Appl. Phys. B,* 60, 383 (1995)].

The only works (including a registered patent) on solid materials for dye lasers in which the dye is to be found in covalent anchorage with a polymeric matrix, has been published by our group. With other purposes, especially the photostablization of solid polymers, polyers have been described in which a chromophore with an ethylenic substitute has been introduced in the polymeric chain by copolymerization. Used as monomers in said works with a different purpose were among others, acrylates, styrene and vinyl chloride [F. A.Bottino, G.Di Pascuale and A.Pollicino, *Macromolec* 23,2662(1990); K. P.Ghiggino, A. D.Saully, S. W.Biggen and M. D.Yandell, *J.Polym, Sci. Part C; Polym. Lett* 26, 505(1988); D. B.O'Connor, G. W.Scott, D.

R. Coulter, A. Gupta, S. P. Webb, S. W. Yeh and J. H. Clark, *Chem. Phys. Lett* 121, 417(1985)].

DESCRIPTION OF THE INVENTION

The present invention is based on the use of a series of dyes with a common structure; the xanthene skeleton substituted by phenyl in position 9, and which in position 2' of said phenyl, possesses a group of esterified carboxyl by an R group with an unsaturation which may be polymerized.

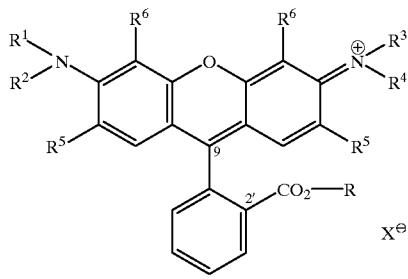

The introduction of the unsaturated R group in the dye molecule is preferably carried out by a reaction between a Rhodamine having a free carboxyl group in position 2'(R=H), and an unsaturated halogenated derivative, performing the reaction in the presence of a base, such as anhydrid solid carbonate. The reaction between carboxylic acid salts and halogenated derivatives, especially allylics or benzylics is well known as a manner of obtaining, generally with good efficiency, esters of said acids.

For example, the reaction between Rhodamine 19 and a free carboxyl group in position 2', and allyl chloride leads in the corresponding allylic ester, a compound which maintains the chromophore intact and which may additionally copolymerize by the double allylic union with conventional monomers.

In the present invention is also patented, the introduction in the dye molecule of unsaturated groups in the same position 2', through spacer groups which possess an allylic or benzylic halogen. Thus, the chromophore is more distanced from the polymer chain than in the previous case, which presents advantages in some cases, also being able to use greatly varied polymerizable groups without being limited to the monomers which possess a halogen in their molecule.

As an example of a halogenated derivative which possesses a spacer group between the halogen and the monomer, we propose a benzyl chloride substituted in position para by group $CO_2(CH_2)_nOCOC(x)=CH_2$ where n may be comprised between 1 and 18, and X may be H, methyl, ethyl, etc. Said benzyl chlorides are obtained by the reaction between the pchloromethylbenzoic acid ($ClCH_2-C_6H_4-COCl$) and the corresponding unsaturated alcohol $HO-(CH_2)_nOCOC(X)=CH_2$.

Incorporation of the Dye to a Polymeric Matrix

The present invention incorporates the dye to a polymeric solid matrix. Said incorporation may be performed in three well differentiated ways:

a) by covalent union to a functionalized polymer, either as a lateral substituent of the main chain of the polymer or as a terminal group of the same.
b) by direct copolymerization of the monomeric dye.
c) by incorporation, as additive, of the previous copolymer to another polymer or copolymer.

The three procedures mentionned for Rhodamines, capable of emitting laser light by means of the classical mechanism, are described as follows:

a) Covalent Union of the Dye to a Functionalized Polymer

In this case, the polymer shall posses in its molecule, a group or groups capable of reacting with a Rhodamine possessing in position 2', a free carboxylic group. In order to help the reaction, the reactive group of the polymeric chain may be an allyl halide or even better, of benzyl.

The reaction of the modification or anchorage of the chromophore to the polymer is carried out using generally common techniques and procedures used in organic synthesis for the corresponding reactions between both functional groups in molecules of low molecular weight, with the only limitation being, that said synthesis procedure shall not alter the structure nor the composition of said previously described general formular chromophore, nor introduce any other modification which alters the properties of the laser light emittance of said molecules.

For the use of the resultant polymer, once covalently joined to the actual dye, in the application which is the object of the present Patent of invention, it is advisable to carry out a previous, careful purification of the same. For this, the most suitable methods are the repeated solution and precipitation, or direct ultrafiltration.

b) Direct Copolymerization of the Dye

In this case, the Rhodamine dye, with R rest containing an unsaturation of the type previously described, is copolymerized with one or various monomers in which the monomeric dye is soluble. The unsaturated substitute R may be any of the following groups:

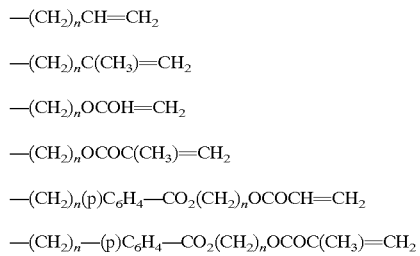

The previous groups may be joined to the carboxyl group in 2' through spacers of type $-(OCH_2)_n^-(OCH_2CH_2)_n^-$; $-O-(CH_2)_n^-$. In all cases, the n value may be between 0 and 12.

For the purposes which are the object of the present Patent of Invention, the previously indicated compounds may be directly polymerized by addition, though it is preferable to copolymerize the same with ethylenically unsaturated monomers, preferably mono and polyfunctional monomers of the vinylic type, acrylic or methacrylic type and their mixtures and combinations. The election of the monomer or monomers is conditioned, in the first place, by its compatibility with the compounds with the described formula, understanding by compatibility, the solubility of the same, without alteration of the structure of the chromophore group. In second place, said election is also conditioned by the necessity that the polymers coming from said monomers do not present light absorption in the region comprised between 337 and 700 nm.

The copolymerization between the previously described dyes and the selected monomers may be carried out in solution, suspension, emulsion, interphase, block or mass. The polymerization process may be thermally or photochemically initiated, preferably by using a generator of free radicals, such as benzoyl peroxide o α,α'-azoisobutyronitryl.

It is advisable to carry out the polymerization with vacuum (at least at 15 Pa) or else at normal pressure, though below an inert atmosphere such as that of nitrogen or argon.

The initial relation between the concentration of the dye and that of the monomer, or mixture of monomers, shall not exceed in any case, value 1.1 in volume, adjusting the proportion of each compound depending on the final absorption desired at the excitation or pumping laser wave length, depending in turn, for each case, on the molar absorption coefficient of the specific dye, considering the contraction of the volumen experimented by the resultant inital solution when polymerized.

The use of polyfunctional nomomers leads to the obtention of interlaced polymers in greater or lesses extension. The degree of interlacing reached in the final polymer depends on the degree of functionality, or number of double olephynic interlaces in the stock monomer molecule, and on the proportion or concentration of the same in the initial dye-monomer solution. It is advisable for the objects to be attained in the present Patent of Invention, that when one or more polyfunctional monomers are employed, the polymerization be performed as a block, in molds, with one geometric configuration similar to the one it is desired to have when the polymeric material is going to be employed in the generation of the laser light. In any way, the obtained interlaced polymer may be machined to the geometric shape desired, using conventional tecniques and tools.

The structural characteristics of the polyfunctional monomers employed in the present case are the same as those previosuly described for monofunctional monomers.

c) By Incorporation of the Polymeric Dye as Additive to Another Polymer

In this case, a polymer or copolymer containing a Rhodamine chromophore covalently anchored, is added to another polymer or copolymer. The polymeric dyes may be incorporated as additives to other polymers in the desired proportion, suitable to the objects to be attained in the present patent of invention, by means of the conventional techniques employed with this purpose in the industry of polymers, considering that the additive procedure employed shall not alter the structure nor the chemical composition of the additive. The polymers to which the polymeric dyes may be incorporated are all those polymers and copolymers which are commercially in existance, with the only limitation that the same do not significantly absorb light in the region comprised between 337 and 700 nm. So that the emittance of light stimulated be efficient, it is advisable that the polymeric dyes be suitably found disolved in the polymer. In accordance with the technique of the present invention, the polymer or copolymer to which the previously indicated polymeric dyes are incorporated, may be lineal, branched or interlaced and preferably, of acrylic, or methacrylic type, or a mixture of both or their copolymers.

Among the acrylic and methacrylic polymers which are most suitable for their use in the present patent of invention, the alkyl polyacrylates or the alkyl polymethacrylates are the most advisable, in which the alkyl group has from 1 to 12 carbon atoms, for example, methyl, ethyl, propyl, butyl, pentyl, hexyl, octyl, nonyl, decyl, undecyl and dodecyl, and their isomers. Being also includable, the poly acrylates or polymethacrylates, substituted, lineal branched or interlaced, provided that their substituents do not interact with the additive.

Another form of incorporating as additive, the said polymeric dyes is by means of a preliminary solution in a monomer or mixture of monomers, ethylenically unsaturated and susceptible of being polymerized by addition. All ethylenically unsaturated, monofunctional (an ethylenically unsaturated group by molecule) or polyfunctional (at least two ethylenically unsaturated groups by molecule) monomers, capable of disolving the previously indicated polymer dyes, forming with the same, real, homogeneous solutions, with suitable concentration for the objects to be achieved in the present patent of invention are suitable. The most suitable monomers are the vinylics, acrylics and methacrylics, the alkyl acrylates or methacrylates being specially advisable, in which the alkyl group possesses from 1 to 12 carbon atoms. Also includable are the vinylic, acrylic and methacrylic substituted monomers, provided their sustituents do not interact with the polymeric dye.

The solution of the polymeric dye in the monomer or mixture of monomers, monofunctional or polyfunctional, may polymerize using any common initiator used for this purpose, the use of generator initiators of free radicals via thermal means being preferable in the present application, (as for example, peroxides, hydroperoxides, azocompounds, etc.), via photochemical means (as for example, benzoine derivatives, aromatic ketones, $\alpha$-hydroxyketones, acyloximes, thioxanthones, etc), or by means of a redox process (as for example, using mixtures of iron salts with hydrogen peroxide, etc.).

Laser Device

The polymeric matrices which are the object of the present invention, are used as active means for the generation of laser radiation on the visible spectral zone.

The polymeric matrices which comprise the laser medium (medium by which laser radiation is to be emitted) may be produced in different geometric shapes, though the most advantageous are 2 cm height solid cylinders with variable diameters, and with a minimum value of 1 cm. Two different assemblies may be used: a) cutting throughout the length of the cylinder axis, with the object of obtaining a flat lateral surface, and b) using the sample without said cut. In the former case, all flat surfaces of the cylinder may be polished until a laser quality is achieved. In the latter case, the polishing shall cover all the surface of the cylinder.

The sample is placed in a standard laser cavity. Three types of cavities may be used:

(i) Flat-flat cavity, formed by a totally reflectant mirror at the emittance wave length of the laser medium and with a window which acts as outlet coupler.

(ii) Flat-flat cavity, formed by a totally reflectant mirror at the laser medium emittance wave length and one side of the cylinder which constitutes said laser medium, used as outlet coupler.

(iii) cavity as in (i) with added intracavity elements (prisms, diffraction network, ethalones) which allow the syntonization of the laser emittance and the narrowing of the band width.

The material is pumped in cross direction with pulsed radiation coming from a laser, for example $N_2$ with energies in the order of 2–3 mJ. The pumping radiation is focused on the side surface of the sample (on the flat side surface in the first of the assemblies previously described), by means of a combination of spherical and cylindrical quartz lens, so that a line of approximately 20×0.25 mm is obtained. In turn, the concentration of the active medium in the sample is selected so that the pumping radiation is totally absorbed at a depth of approximately 0.25 mm.

The material, with the flat side surface, is shifted by means of a suitable device, with pitches of 0.1 to 0.4 mm, at a rate such, that each region is only once irradiated with the pumping radiation. For example, if the rate of repetition of the pumping laser is 1 Hz, the sample shall move in pitches of 0.25 mm per second. Once the edge of the flat zone has been reached, the direction of the displacement is reversed until the other edge has been reached, and thus successively.

In the case of totally cylindrical polymeric matrices, the materials are rotated continuously, also with pitches of 0.1 to 0.4 mm. The rate with which the material is rotated, is adjusted in the same way as for the case of materials with flat side surface. For rotating the cylindrical matrices, the same are attached by the central part of the lateral sides (according to the axis of the cylinder) so that during the rotation, the pumped region which is to emit the laser radiation, always remains well aligned within the cavity.

EXAMPLES

At title of example, a description is herewith given of the obtention of two Rhodamine molecules which possess a copolymerizable ethylenic sustituent with a monomer which is also etylenic (see figures), as well as the embodiment of the copolymerization. All products are identified unequivocally by the general techniques in the analysis of organic compounds. Also described as example is the result to be evaluated, in the described device, of the copolymers as emitters of laser light.

Obtention of Stock Products and of Pattern Dyes
p-chloromethylbenzoate of Ethyl (Cl-Bz-Et)

Obtained by treating the p-(choromethyl)benzoyl chloride with an excess of ethanol. Said latter chloride is obtained, in turn, by treating the p-methylbenzoyl chloride with phosphor pentachloride (according to R. D.Kimbrough and R. N.Gramlett, *J.Org.Chem.* 1969,34, 3655).

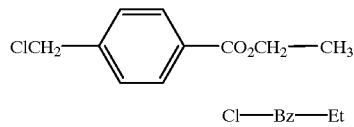

Cl—Bz—Et

Metacrylate of 2-[p(chloromethyl)benzoyloxy]ethyl (Cl-Bz-MA)

In a flask containing a solution of methacrylate of 2-hydroxyethyl (HEMA) (10 mmol) and tryethylamine (11 mmol) in dry acetone (20 mL), add, drop by drop, under agitation and externally cooling with ice, a recently obtained chloride solution of p-(chloromethyl)benzoyl (11 mmol) in acetone (10 mL). The mixture is left to react at room temperature during 1 hr and the solvent is evaporated in vacuum. The liquid residue, after being washed with dry hexane, is used without further purification. Yield 89%.

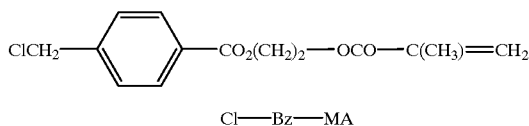

Cl—Bz—MA p-(methoxycarbonyl)benzylic Ester of Rhodamine 19 (Rh-Bz-Et)

A mixture of Rhodamine 19 (250 mg. 0.6 mmol), Cl-Bz-Et(150 mg, 0.75 mmol) and N,N-dimethylformamide (15 mL) is heated at 50° C. during 5 days, in the absence of light, under agitation and in a nitrogen atmosphere. The evaporation in vacuum of the solvent causes a solid which is purified by passing through two successive chromatography columns (silica gel, 500 mL of methylene-ethanol chloride 3:2 v/v as eluant for the former, and 200 mL ethyl acetate, followed by 300 mL ethyl-ethanol acetate 1.2 v/v t of 200 mL of ethanol, for the latter). The ester Rh-Bz-Et thus isolated (red crystals) is washed with hexane and vacuum dried. It gives one single stain in thin layer chromatography in various eluants. Yield 36%.

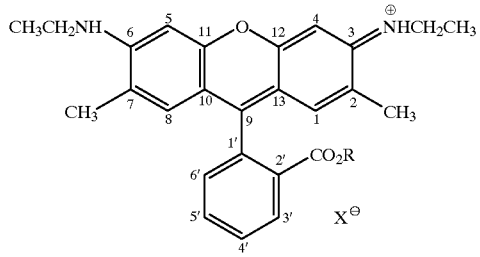

| | R | X |
|---|---|---|
| Rhodamine[19] | H | ClO$_4$ |
| Rhodamine$_G$ | CH$_2$—CH$_3$ | Cl |
| Rh—Al | CH$_2$—CH=CH$_2$ | OH |
| Rh—Bz—Et | CH$_2$—C$_6$H$_4$—CO$_2$CH$_2$—CH$_3$ | OH |

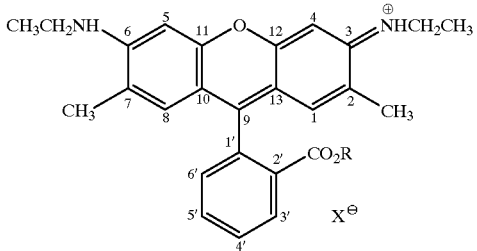

| R | X |
|---|---|
| Rh—Bz—MA 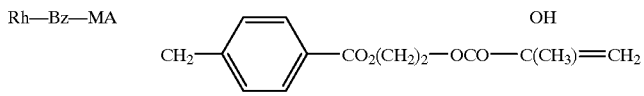 | OH |

Obtention of Rhodamine Monomers

Example 1

Obtention of Allylic Ester of Rhodamine 19 (Rh-Al)

A mixture of Rhodamine 19 (200 mg, 0.44 mmol), allyl chloride (0.9 mL, 11.1 mmol), anhydrous sodium carbonate (204 mg, 1.9 mmol), hydroquinone (trace) and N,N-dimethylformamide (25 mL) is heated at reflux under agitation, in the absence of light and in a nitrogen atmosphere, during 30 hr. The evaporation of the solvents leads to a mixture from which is separated the Rh-Al allyl ester by chromatography in column (silica gel, chloroform-methanol 85:15 v/v as eluant). The resultant solid gives one single stain in thin layer chromatography in various eluants. The product, once dry, is used without subsequent purification. It gives one single stain in thin layer chromatography in various eluants. Yield 36%. P.f.238–240° C. Uvvis (EtOH): $\lambda_{max}$530 nm, $\epsilon$80.900 $M^{-1}$ $cm^{-1}$.

Example 2

Obtention of p-[2-(Methacryloiloxy)ethoxicarbonyl] benzylic Ester of Rhodamine 19 (Rh-BzMA)

A mixture of Rhodamine 19 (414 mg, 1 mmol), Cl-Bz-MA (355 mg, 1.25 mmol) anhydrous sodium carbonate (408 mg, 3.8 mmol) and p-methoxyphenol (traza) in N,N-dimethylformamide (15 mL) is heated at 50° C. during 4 days, in the absence of light, under agitation and in a nitrogen atmosphere. The evaporation of the solvent causes a solid which is purified by passing through two successive chromatography columns (silica gel, 250 mL of methylene-ethanol chloride 3:2 v/v as eluant for the former, and 150 mL of ethyl acetate, followed by 350 mL of ethyl ethanol acetate 1.1 v/v and of 150 mL ethanol, for the latter). The residue obtained is washed with hexane and vacuum dried. The Rhodamine ester 19 Rh-Bz-MA (isolated in the form of ammonium base) is used without ulterior purification. It gives one single stain on thin layer chromatography in various eluants. Yield 44%. Vis (EtPH),$\lambda_{max}$ 519 nm).

Obtention of Copolymers and Terpolymers

Example 3

To a homogeneous solution of monomer-dye RhAl (5.7 mg. 0.012 mmol) in methyl methacrylate (5 ml) and 2-hydroxyethyl methacrylate (5 ml), is added $\alpha,\alpha'$-azoisobutyronitryl (10 mg; 0.06 mmol) as initiator. After disolving the initiator, a 12 mm inner diameter cylindrical mold is filled with the resultant solution. The solution, once in the mold, is deoxygenized by means of bubbling of nitrogen or pure argon with the help of a capilar which is immersed in the solution during a few minutes (5–10 min). The mold is tight locked, under nitrogen atmosphere, and kept at 40° C. during 4–5 days in the dark. Once the sample has solidified, it is slowly brought to temperature (5° C./day) until the 55° C. has been reached, maintaining this temperature during 2 hours. Next, the temperature is again made to rise to 80° C. (5° C./day), slowing cooling to room temperature, finally demolding the cylinder.

Example 4

In identical manner as to that described in the previous example, a solution is prepared of monomer dye Rh-Bz-MA (6.25 mg; 0.01 mmol) in the methyl matacrylate mixture (5 ml) and 2-hydroxyethyl metacrylate (5 ml). Add $\alpha,\alpha'$-azoisobutyronitryl (15 mg, 0.09 mmol) which is disolved under agitation. The resultant solution is microfiltered with a membrane with pore size 0.2 $\mu$m, proceeding to fill the mold described as in the previous example, following an identical procedure. The mold is maintained at 40° C. during four days, after which, the temperature is slowly made to rise up to 55° C., keeping this temperature during another four days. Next, the temperature is made to rise again (10° C./day), until 80° C. is reached, with the object of eliminating the residues of initiator which have not decomposed. Finally, slowing cool to room temperature, finally demolding the cylinder.

Example 5

Evaluation of the Polymeric Dyes as Emitters of Stimulated Radiation

The photophysical study carried out in the previously described device, using as laser emitters Rhodamines covalently anchored to methyl methacrylate and 2-hydroxyethyl methacrylate copolymers, is shown in Table 1. Also included are two results of models Rh 6G and Rh-Bz-Et, disolved in HEMA:MMA 1:1 copolymers.

Table 1. Characteristics as emitters of dye lasers of the Rhodamines family disolved in free form in methyl methacrylate and 2-hydroxyethyl methacrylate copolymers or anchored by covalent union to copolymers of the same monomers (laser pumping of $N_2$, at 337 nm; pumping energy: 1.2 mJ).

| Compound | $\lambda_{eemax}$ (nm) | $\Delta\lambda$ (nm) | $E_{bu}$ (mJ) | $\eta_1$ (%) | Number of flashes | | |
|---|---|---|---|---|---|---|---|
| | | | | | 15 Hz | 5 Hz | 2 Hz |
| Rh6G in P (HEMA:MMA 1:1) | 593 | 13 | 0.48 | 21 | 8500 | 8500 | 8500 |
| P[Rh-Al + (HEMA:MMA 1:1)] | 589 | 12 | 0.48 | 11 | 4500 | 6000 | 6000 |
| Rh-Bz-Et in P (HEMA:MMA 1:1) | 585 | 10 | 0.50 | 16 | 5000 | 6000 | 7500 |
| P[Rh-Bz-MA + (HEMA:MMA 3:7) | 594 | 10 | 0.42 | 19 | 900 | 1700 | 3500 |
| P[Rh-Bz-MA + (HEMA:MMA 1:1)] | 587 | 11 | 0.58 | 18 | 9000 | 10500 | 13500 |
| P[Rh-Bz-MA + (HEMA:MMA 7:3)] | 593 | 10 | 0.65 | 18 | 8000 | 9000 | 20000 |
| P[Rh-Bz-MA + (HEMA:MMA 10:0)] | 591 | 11 | 0.56 | 14 | 7000 | 7000 | 15000 |

Table 1 shows the maximum wave length of its stimulated emittance ($\lambda_{ee.max}$), the band width at medium height of the laser emittance ($\Delta\lambda$), the threshold energy of the pumping ($E_{bu}$), the efficiency of the laser ($\eta_1$) and the relative stability of the samples at different rates s of repetition, expressed as the number of flashes which may be supported on the same position until the 80% of the laser emittance is lost.

The properties of compound Rh 6G/P(HEMA:MMA 1:1), in which the Rhodamine 6G molecules are simply disolved in the methyl methacrylate and 2-hydroxyethyl methacrylate 1:1 copolymer, which have been previously published by us [A. Costela, F. Florido, I. García-Moreno, R.Dochowicz, F.Amat-Guerri, J. M.Figuera, and R.Sastre, *Appl.Phys,B* 60, 383 (1995)] is included as reference. The high photostability of the materials are to be emphasized, in which the dye is covalently joined to the polymeric chain through a spacer (provided that the proportion of MMA in the copolymer is not high). In fact, when sample [Rh-Bz-MA (HEMA:MMA 7:3)] is assembled on the previously described rotational device, the emittance of the laser continues stable, without significant decrease of the emittance after 500,000 shots. As to the efficiency obtained with the best samples, they are similar to the ones obtained in the same experimental system for Rhodamine 6G in ethanolic solution.

What is claimed is:

1. A solid polymeric matrix containing rhodamine, wherein said matrix comprises polymerized monomers of a rhodamine chromophore having a phenyl at position 9 and an esterified carboxyl at position 2' of the phenyl, the matrix, when irradiated, emitting laser radiation, the monomers having the general formula

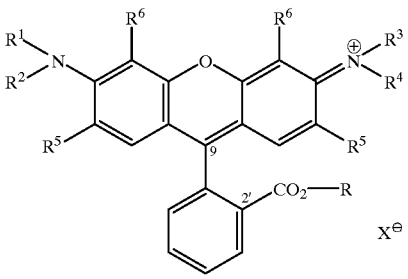

wherein $R^1$, $R^2$, $R^3$, $R^4$, $R^5$, $R^6$ independently are hydrogen or saturated alkyl groups of 1 to 6 carbons, and wherein R is an unsaturated group capable of polymerization or copolymerization, selected from at least one of the group consisting of —$(CH_2)_n OCOCH=CH_2$ —$(CH_2)_n (p)C_6H_4$—$CO_2(CH_2)_n OCOCH=CH_2$ and —$(CH_2)_n$—$(p)C_6H_4$—$CO_2(CH_2)_n OCOC(CH_3)=CH_2$;

said R group optionally joined to said carboxyl at position 2' of the phenyl by a spacer selected from the group consisting of —$(OCH_2)_n^-$, $(OCH_2CH_2)_n^-$; —O—$(CH_2)_n^-$, and combinations thereof; wherein n independently represents a number between 1 and 12; said matrix, when being a polymer of said rhodamine chromophore, hydroxyethyl methacrylate and methylmethacrylate, comprising a proportion of hydroxyethyl methacrylate to methylmethacrylate of at least 1:1; X is an anion;

and wherein said rhodamine chromophore has been synthesized by reacting rhodamine having a free carboxylic acid group in position 2' and an unsaturated halogen derivative selected from the group consisting of substituted and unsubstituted allyl halides, and substituted or unsubstituted benzyl.

2. The solid polymeric matrix of claim 1 wherein said rhodamine chromophore has been synthesized by reacting rhodamine having a free carboxylic acid group in position 2' and an unsaturated halogen derivative selected from the group consisting of substituted and unsubstituted allyl halides, and substituted or unsubstituted benzyl, comprising an unsaturated group, at least one of the allyl group and the unsaturated group being capable of polymerizing or copolymerizing with at least another monomer.

3. The solid polymeric matrix of claim 1 wherein the matrix has been prepared by a reaction of polymerization or copolymerization with at least another monomer, whereby a solid with the shape of the mold in which the reaction takes place is formed.

4. The solid polymeric matrix of claim 2 wherein said shape is a cylinder.

5. The solid polymeric matrix according to claim 2, wherein the solid is in the shape a cylinder portion having an axial flat lateral surface obtained by cutting a cylinder obtained in a cylindrical mold by the axis thereof.

6. The solid polymeric matrix according to claim 2, comprising an active medium for generating laser radiation in a spectral zone selected from ultraviolet, visible or infrared adjacent spectral zones.

7. A solid polymeric matrix according to claim 1, wherein said anion is at least one of $OH^-$, $Cl^-$, or $ClO_4^-$.

8. A solid polymeric matrix containing rhodamine, wherein said matrix comprises polymerized monomers of a rhodamine chromophore having a phenyl at position 9 and an esterified carboxyl at position 2' of the phenyl, the matrix, when irradiated, emitting laser radiation, the monomers having the general formula

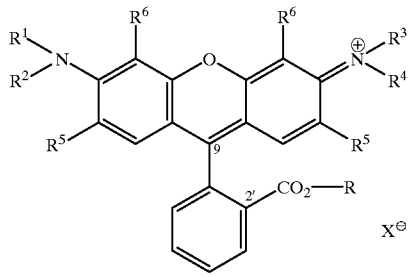

wherein $R^1$, $R^2$, $R^3$, $R^4$, $R^5$, $R^6$ independently are hydrogen or saturated alkyl groups of 1 to 6 carbons, and wherein R is a $-(CH_2)_n(p)C_6H_4-CO_2(CH_2)_nOCOCH=CH_2$ group capable of polymerization or copolymerization; said R group optionally joined to said carboxyl at position 2' of the phenyl by a spacer selected from the group consisting of $-(OCH_2)_n{}^-$, $(OCH_2CH_2)_n{}^-$; $-O-(CH_2)_n{}^-$, and combinations thereof; wherein n independently represents a number between 1 and 12; said matrix, when being a polymer of said rhodamine chromophore, hydroxyethyl methacrylate and methylmethacrylate, comprising a proportion of hydroxyethyl methacrylate to methylmethacrylate of at least 1: 1; and X is an anion.

9. The solid polymeric matrix of claim 8, wherein said rhodamine chromophore has been synthesized by reacting a rhodamine having a free carboxylic acid group in position 2' and an unsaturated halogen derivative selected from the group consisting of substituted and unsubstituted allyl halides, and substituted or unsubstituted benzyl, comprising an unsaturated group, the allyl group or the unsaturated group being capable of polymerizing or copolymerizing with at least another monomer.

10. The solid polymeric matrix of claim 8 wherein the matrix has been prepared by a reaction of polymerization or copolymerization with at least another monomer, whereby a solid with the shape of the mold in which the reaction takes place is formed.

11. The solid polymeric matrix of claim 10 wherein said shape is a cylinder.

12. The solid polymeric matrix according to claim 10, wherein the solid is in the shape a cylinder portion having an axial flat lateral surface obtained by cutting a cylinder obtained in a cylindrical mold by the axis thereof.

13. The solid polymeric matrix according to claim 8, comprising an active medium for generating laser radiation in a spectral zone selected from ultraviolet, visible or infrared adjacent spectral zones.

14. The solid polymeric matrix according to claim 8, wherein the anion is at least one of OH⁻, Cl⁻, or $ClO_4{}^-$.

15. A solid polymeric matrix containing rhodamine, wherein said matrix comprises polymerized monomers of a rhodamine chromophore having a phenyl at position 9 and an esterified carboxyl at position 2' of the phenyl, the matrix, when irradiated, emitting laser radiation, the monomers having the general formula

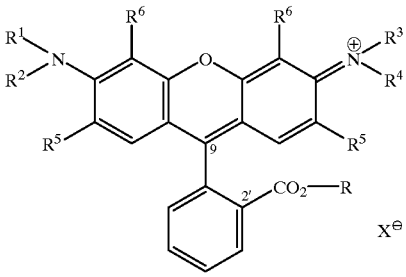

wherein $R^1$, $R^2$, $R^3$, $R^4$, $R^5$, $R^6$ are independently hydrogen or saturated alkyl groups of 1 to 6 carbons, and wherein R is a $-(CH_2)_n-(p)C_6H_4-CO_2(CH_2)_nOCOC(CH_3)=CH_2$ group capable of polymerization or copolymerization; said R group optionally joined to said carboxyl at position 2' of the phenyl by a spacer selected from the group consisting of $-(OCH_2)_n{}^-$, $(OCH_2CH_2)_n{}^-$; $-O-(CH_2)_-$, and combinations thereof; wherein n independently represents a number between 1 and 12; said matrix, when being a polymer of said rhodamine chromophore, hydroxyethyl methacrylate and methylmethacrylate, comprising a proportion of hydroxyethyl methacrylate to methylmethacrylate of at least 1: 1; and X is an anion.

16. The solid polymeric matrix according to claim 15, wherein the rhodamine chromophore have been synthesized by reacting a rhodamine having a free carboxylic acid group in position 2' and an unsaturated halogen derivative selected from the group consisting of substituted and unsubstituted allyl halides, and substituted or unsubstituted benzyl, comprising an unsaturated group, the allyl group or the unsaturated group being capable of polymerizing or copolymerizing with at least another monomer.

17. The solid polymeric matrix according to claim 15, wherein the matrix has been prepared by polymerization or copolymerization of the monomers of rhodamine chromophores with at least another monomer, whereby a solid with the shape of the mold in which the reaction takes place is formed.

18. The solid polymeric matrix according to claim 17, wherein the solid is in the shape of a cylinder.

19. The solid polymeric matrix according to claim 18, wherein the solid is in the shape a cylinder portion having an axial flat lateral surface obtained by cutting a cylinder obtained in a cylindrical mold by the axis thereof.

20. The solid polymeric matrix according to claim 15, comprising an active medium for generating laser radiation in a spectral zone selected from ultraviolet, visible or infrared adjacent spectral zones.

21. The solid polymeric matrix according to claim 15, wherein the anion is at least one of OH⁻, Cl⁻, or $ClO_4{}^-$.

22. The solid polymeric matrix according to claim 15 wherein R is $-(CH_2)_n-(p)C_6H_4-CO_2(CH_2)_nOCOC(CH_3)=CH_2$ and n=2.

23. A method of generating laser radiation using a solid polymeric matrix as an active medium, the matrix comprising polymerized monomers of a rhodamine chromophore, said monomers having the general formula,

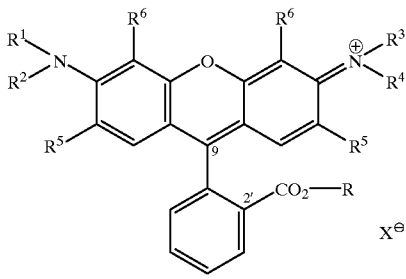

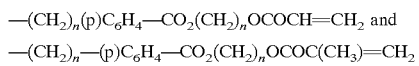

wherein $R^1$, $R^2$, $R^3$, $R^4$, $R^5$, $R^6$ independently are hydrogen or saturated alkyl groups of 1 to 6 carbons, and wherein R is an unsaturated group capable of polymerization or copolymerization, selected from at least one of the group consisting of —$(CH_2)_n(p)C_6H_4$—$CO_2(CH_2)_nOCOCH$=$CH_2$ and —$(CH_2)_n$—$(p)C_6H_4$—$CO_2(CH_2)_nOCOC(CH_3)$=$CH_2$ wherein n independently represents a number between 1 and 12; said matrix, when being a polymer of said rhodamine chromophore, hydroxyethyl methacrylate and methylmethacrylate, comprising a proportion of hydroxyethyl methacrylate to methylmethacrylate of at least 1:1; X is an anion;

the matrix being a solid in the shape of a cylinder portion having an axial flat lateral surface obtained by cutting a cylinder obtained in a cylindrical mold by the axis thereof; placing the solid in a standard laser cavity, irradiating the matrix for emitting laser radiation, and shifting the solid, by means of a shifting device, from a first edge of the flat surface, in pitches of 0.1 to 0.4 mm, to a second edge of the flat surface, at a rate such that each region of the flat surface is irradiated with a pumping radiation only once, whereby when the second edge of the flat surface has been reached, shifting is reversed until said first edge is reached, whereby shifting and reversed shifting are repeated successively, thereby generating laser radiation in a spectral zone selected from ultraviolet, visible or infrared adjacent spectral zones.

24. The method of claim 23 wherein said unsaturated group is bonded to the carboxyl group in position 2' by at least one spacer selected from the group consisting of —$(OCH_2)_n^-$, $(OCH_2CH_2)_n^-$; and —O—$(CH_2)_n^-$; wherein n independently represents a number between 1 and 12.

25. The method of claim 23 wherein said rhodamine chromophore has been synthesized by reacting rhodamine having a free carboxylic acid group in position 2' and an unsaturated halogen derivative selected from the group consisting of substituted and unsubstituted allyl halides, and substituted or unsubstituted benzyl, comprising an unsaturated group, at least one of the allyl group and the unsaturated group being capable of polymerizing or copolymerizing with at least another monomer.

26. The method of claim 23 wherein the matrix has been prepared by a reaction of polymerization or copolymerization with at least another monomer, whereby a solid with the shape of the mold in which the reaction takes place is formed.

27. The method of claim 23 where the matrix is used as an active medium for generating laser radiation in a spectral zone selected from ultraviolet, visible or infrared adjacent spectral zones.

28. The method of claim 23 wherein said anion is at least one of $OH^-$, $Cl^-$, or $ClO_4^-$.

29. The method of claim 23 wherein said R is —$(CH_2)$ n-$(p)C_6H_4$—$CO_2(CH_2)_nOCOC(CH_3)$=$CH_2$ and n=2.

30. A method of generating laser radiation using a solid polymeric matrix as an active medium, the matrix comprising polymerized monomers of a rhodamine chromophore, the monomers having the general formula,

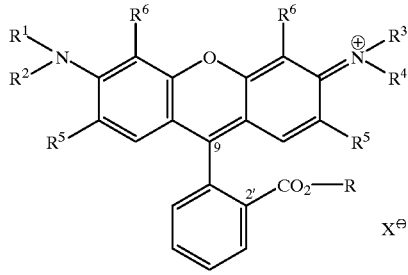

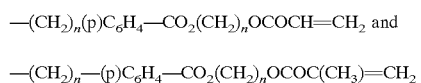

wherein $R^1$, $R^2$, $R^3$, $R^4$, $R^5$, $R^6$ independently are hydrogen or saturated alkyl groups of 1 to 6 carbons, and wherein R is an unsaturated group capable of polymerization or copolymerization, selected from at least one of the group consisting of —$(CH_2)_n(p)C_6H_4$—$CO_2(CH_2)_nOCOCH$=$CH_2$ and —$(CH_2)_n$—$(p)C_6H_4$—$CO_2(CH_2)_nOCOC(CH_3)$=$CH_2$ wherein n represents a number between 1 and 12; said matrix, when being a polymer of said rhodamine chromophore, hydroxyethyl methacrylate and methylmethacrylate, comprising a proportion of hydroxyethyl methacrylate to methylmethacrylate of at least 1:1; X is an anion; the matrix being a solid is in the shape of a cylinder, the method comprising placing the solid in a standard laser cavity, irradiating the matrix for emitting laser radiation, and continuously rotating the solid in pitches of 0.1 to 0.4 mm, such that each region of the matrix is irradiated with a pumping radiation only once in one total rotation of the solid, thereby generating laser radiation in a spectral zone selected from ultraviolet, visible or infrared adjacent spectral zones.

31. The method of claim 30 wherein said unsaturated group is bonded to the carboxyl group in position 2' by at least one spacer selected from group consisting of —$(OCH_2)_n^-$, $(OCH_2CH_2)_n^-$; and —O—$(CH_2)_n^-$; wherein n represents a number between 1 and 12.

32. The method of claim 30 wherein said rhodamine chromophore has been synthesized by reacting rhodamine having a free carboxylic acid group in position 2' and an unsaturated halogen derivative selected from the group consisting of substituted and unsubstituted allyl halides, and substituted or unsubstituted benzyl, comprising an unsaturated group, at least one of the allyl group and the unsaturated group being capable of polymerizing or copolymerizing with at least another monomer.

33. The method of claim 30 wherein the matrix has been prepared by a reaction of polymerization or copolymerization with at least another monomer, whereby a solid with the shape of the mold in which the reaction takes place is formed.

34. The method of claim 30 where the matrix is used as active medium for generating laser radiation in a spectral zone selected from ultraviolet, visible or infrared adjacent spectral zones.

35. The method of claim 30 wherein said anion is at least one of $OH^-$, $Cl^-$, or $ClO_4^-$.

36. The method of claim 30 wherein R is —$(CH_2)_n$—(p) $C_6H_4$—$CO_2(CH_2)_n OCOC(CH_3)$=$CH_2$ and n=2.

37. A method according to claim 30, wherein the solid in the shape of a cylinder which is fastened by center portions of bases such that when the matrix is rotated, the pumped region which is to emit laser radiation, always remains aligned within the laser cavity.

* * * * *